United States Patent
Gandhi et al.

(10) Patent No.: US 7,329,629 B2
(45) Date of Patent: Feb. 12, 2008

(54) CATALYST SYSTEM FOR LEAN BURN ENGINES

(75) Inventors: Haren S Gandhi, West Bloomfield, MI (US); Jun (John) Li, Canton, MI (US); Joseph Robert Theis, Rockwood, MI (US); Ronald Gene Hurley, Plymouth, MI (US); William Lewis Henderson Watkins, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 10/065,497

(22) Filed: Oct. 24, 2002

(65) Prior Publication Data

US 2004/0082470 A1 Apr. 29, 2004

(51) Int. Cl.
*B01J 23/00* (2006.01)

(52) U.S. Cl. ............ 502/325; 502/304; 502/328; 502/330; 502/339; 502/340; 502/344

(58) Field of Classification Search .......... 502/302, 502/303, 304, 325, 328, 330, 332, 339, 340, 502/344, 349
See application file for complete search history.

(56) References Cited

U.S. PATENT DOCUMENTS

| | | | |
|---|---|---|---|
| 4,024,706 A | | 5/1977 | Adawi et al. |
| 4,500,650 A | | 2/1985 | Wyatt et al. |
| 4,675,308 A | | 6/1987 | Wan et al. |
| 4,678,770 A | | 7/1987 | Wan et al. |
| 5,010,051 A | * | 4/1991 | Rudy ............... 502/304 |
| 5,179,060 A | | 1/1993 | Subramanian et al. |
| 5,196,175 A | | 3/1993 | Subramanian et al. |
| 5,459,119 A | * | 10/1995 | Abe et al. ............ 502/326 |
| 6,087,298 A | * | 7/2000 | Sung et al. ........... 502/333 |
| 6,375,910 B1 | * | 4/2002 | Deeba et al. .......... 423/239.1 |
| 2001/0031699 A1 | * | 10/2001 | Matsumoto et al. ...... 502/303 |
| 2001/0036432 A1 | * | 11/2001 | Hu et al. ............ 423/213.5 |
| 2002/0131914 A1 | * | 9/2002 | Sung ............... 422/177 |
| 2004/0043897 A1 | * | 3/2004 | Tadao ............... 502/302 |

FOREIGN PATENT DOCUMENTS

| | | |
|---|---|---|
| EP | 0 915 244 A2 | 5/1999 |
| EP | 0 927 571 A2 | 7/1999 |
| EP | 0 930 425 A2 | 7/1999 |

(Continued)

*Primary Examiner*—Kevin P. Kerns
(74) *Attorney, Agent, or Firm*—Damian Porcari Brooks Kushman P.C.

(57) ABSTRACT

A catalyst system to provide emission reductions under lean and stoichiometric conditions. The catalyst system comprises a forward catalyst having a first cerium-free zone including oxides of aluminum, alkali metals and alkaline earth metals and precious metals and a second zone with a lower loading of precious metals, oxides of aluminum, alkali metals or alkaline earth metals. This forward catalyst stores NOx emissions under lean conditions for subsequent reduction and converts HC, CO and NOx during stoichiometric operation. The second downstream catalyst includes precious metals, reduces emissions under stoichiometric conditions, and stores any residual NOx emitted from the first catalyst for subsequent reduction. In another embodiment, a forward catalyst has top and bottom layers designed to reduce emissions under lean conditions. In this embodiment, a second downstream catalyst is used to reduce emissions under stoichiometric conditions. In yet another catalyst, multiple zones are created within a single catalyst.

22 Claims, 4 Drawing Sheets

FOREIGN PATENT DOCUMENTS

| | | |
|---|---|---|
| EP | 0 980 707 A1 | 2/2000 |
| EP | 1 066 874 A1 | 1/2001 |
| EP | 1 080 783 A2 | 3/2001 |
| EP | 1 108 863 A2 | 6/2001 |
| EP | 0 764 459 B1 | 10/2001 |

* cited by examiner

CATALYST SYSTEM FOR LEAN BURN ENGINES

BACKGROUND OF INVENTION

1. Field of the Invention

The present invention is directed to a catalyst system for use with internal combustion engines to oxidize hydrocarbons, carbon monoxide and reduce nitrogen oxides in an exhaust gas when the engine is operated at both lean and stoichiometric air/fuel ratios. More particularly, the catalyst system of this invention includes two catalysts. One of the catalysts is designed specifically to store NOx emissions under lean conditions and reduce the stored NOx during rich operation. Additionally, this catalyst also serves to convert HC, CO and NOx during stoichiometric operation. This catalyst consists of two zones—a cerium-free zone containing aluminum oxide, oxides of alkali metals, alkaline earth metals and a high loading of precious metals, and a second zone of oxides of aluminum, alkali metals, alkaline earth metals, rare earth metals, or combinations thereof, and a lower loading of precious metals. The first catalyst can also be layered to achieve emission reduction under lean conditions.

The second catalyst is designed specifically to optimize the conversion of HC, CO and NOx under stoichiometric operations. The second catalyst also stores any NOx emitted from the first catalyst during lean operation and converts the stored NOx during the rich purges. The second catalyst contains precious metals, aluminum oxides, a high concentration of mixed oxides of zirconium and cerium and alkali metals or alkaline earth metals such as barium oxide or magnesium oxide.

2. Background Art

Catalysts have long been used in the exhaust systems of automotive vehicles to convert carbon monoxide, hydrocarbons, and nitrogen oxides (NOx) produced during engine operation into non-polluting gases including carbon dioxide, water, and nitrogen. When a gasoline powered engine is operated at a stoichiometric or slightly rich air/fuel ratio, i.e., between about 14.6 and 14.4, catalysts containing precious metals such as platinum, palladium and rhodium are able to efficiently convert all three gases simultaneously. Typically, such catalysts use a moderate loading of precious metals to achieve the high conversion efficiency required to meet the stringent emission standards of many countries. Because of the high cost of the precious metals, these catalysts are expensive to manufacture.

To improve vehicle fuel efficiency and lower $CO_2$ emissions, it is preferable to operate an engine under lean conditions. Lean conditions are air/fuel mixtures greater than the stoichiometric mixture (an air/fuel mixture of 14.6), typically air/fuel mixtures greater than 15. While lean operation improves fuel economy, operating under lean conditions increases the difficulty of treating some polluting gases, especially NOx.

For some catalysts, if the air/fuel ratio is lean by even a small amount, NOx conversion is significantly reduced. One way to provide air/fuel control is through the use of a HEGO (Heated Exhaust Gas Oxygen) sensor to provide feedback to the control systems. HEGO sensors, however, over time can develop a lean bias as a result of poisoning. Accordingly, even with a HEGO sensor it is important to have a catalyst that can minimize noxious emissions, especially NOx, under lean conditions.

To decrease NOx emissions, under lean operating conditions, a lean NOx trap is frequently used. The NOx trap functions in a cyclic manner. The NOx trap stores NOx during lean operation. When the NOx trap approaches its NOx storage capacity, the engine is operated under rich conditions to reduce the stored NOx and purge the NOx trap. After the NOx trap has been purged, the engine can return to lean operation.

However, in addition to problems associated with thermal stability and sulfur tolerance, lean NOx traps have the following two known problems: (1) a problem referred to as "NOx release", the release of unreduced NOx from the NOx trap during the transition from lean to rich conditions; and (2) a reduction in fuel economy that results from frequent purges of the NOx trap. FIG. 2 shows the NOx release for a catalyst with different oxygen storage capacities ("OSC"). This NOx release has been found to be greater than 35% of the total NOx emitted during a vehicle test using the FTP vehicle test cycle.

FIG. 2 also shows the effects of oxygen storage capacity of a lean NOx trap on the NOx release during the lean to rich transition. LNT L, which has the highest OSC, results in the largest amount of NOx release, while the lower the OSC (from LNT M down to LNT N), the lower the amount of NOx release. It is believed that the NOx release during the lean-rich transition is due to the exothermic heat generated from the oxidation of reductants, CO, HC, and $H_2$, by the oxygen released from the oxygen storage material—the temperature rise can be as high as 80-100° C. If the bed temperature is higher than the peak storage temperature of the trap (i.e., in the range of decreasing NOx storage capacity) and the amount of NOx stored is near the capacity of the trap at that temperature, the exothermic temperature rise can cause the release of NOx in order to bring the amount of NOx storage back to the maximum amount that can be stored at the higher surface temperature. In FIG. 2, the trap with high oxygen storage capacity (OSC) had much larger NOx release than the trap with low oxygen storage capacity.

With regard to the fuel economy penalty, this is believed to be the result of high oxygen storage capacity (OSC), low NOx trapping capacity, and/or high exhaust flow rate in the lean NOx trap. The OSC requires additional reductants (i.e., fuel) to reduce the oxygen storage materials during each lean-to-rich transition, while the low NOx trapping capacity requires that the frequency of purges be increased.

To solve the above problems, the present invention provides a new catalyst system comprising two catalysts that can treat CO, HC and NOx, under both stoichiometric and lean conditions. Furthermore, the design of the present invention minimizes the purge NOx release and minimizes the fuel economy penalty associated with the rich purges.

The closest known prior art includes the following patents. For example, U.S. Pat. No. 4,024,706, incorporated by reference herein, teaches a method of enlarging the air/fuel ratio over which a catalyst operates by including an oxygen storage material. The method involves controlling the air/fuel ratio of the fuel mixture being burned by the engine such that the air/fuel ratio oscillates between a lean condition and a rich condition of equal magnitudes about the stoichiometric mixture.

U.S. Pat. No. 4,500,650 teaches a catalyst comprising a substrate, a refracting oxide layer, tungsten and/or one or more tungsten-containing compounds and one or more platinum group metals.

U.S. Pat. No. 4,678,770 teaches a method of creating a three-way catalyst, wherein rhodium is segregated from rare earth oxide to increase catalyst efficiencies under lean exhaust conditions.

U.S. Pat. No. 5,179,060 teaches a catalyst including a platinum group metal impregnation layer covering an alumina substrate layer. While this layering approach enhances the ability of the platinum to reduce exhaust emissions under stoichiometric conditions, it does not sufficiently reduce NOx emissions under prolonged lean engine conditions.

The present catalyst system solves the problem of the prior art by providing discrete catalyst compositions designed to maximize emissions reduction under stoichiometric conditions and lean conditions in a cost-effective manner.

SUMMARY OF INVENTION

The present invention is directed to a catalyst system for use with an internal combustion engine. In broad terms, the catalyst system of this invention is designed specifically to store the NOx emissions during lean exhaust conditions and reduce the stored NOx during rich purges. The catalyst system can be a single catalyst having multiple catalyst zones or layers or a combination of two or more catalysts. Irrespective of whether one zoned/layered catalyst or two separate catalysts are used to create the catalyst system of this invention, the end result is the same. The catalyst system is designed to maximize the reduction of engine emissions under both stoichiometric and lean conditions. Accordingly, a first zone/layer or catalyst is designed to optimize NOx reduction under lean conditions, and convert HC, NOx and CO under stoichiometric conditions. A second zone/layer or catalyst is designed to function similar to other catalysts which convert HC, CO and NOx under stoichiometric conditions. This second catalyst also stores any residual NOx emitted from the first catalyst during lean operation and converts the stored NOx during the rich purges.

In one embodiment, the catalyst system includes two close-coupled catalysts. The principle function of the first catalyst is to store NOx under lean air/fuel ratios and reduce the stored NOx during rich purges. This first catalyst also serves to convert HC, CO and NOx during stoichiometric operation. This first catalyst preferably contains two zones. The first zone is coated with a catalyst mixture PM-Rh, where PM is a catalyst material containing Pt, Pd or combinations thereof and the PM to Rh ratio is between 5:1 to 25:1. The first zone further includes metal oxides, such as oxides of aluminum, alkali metals, alkaline earth metals or combinations thereof, and is devoid of cerium. The second zone is coated with oxides of aluminum, alkali metals, alkaline earth metals, rare earth metals or combinations thereof and a lower loading of precious metal with a PM to Rh ratio of 1:1 to 10:1. This second zone may optionally also include a small amount of mixed oxides of zirconium. The second catalyst is designed to optimize hydrocarbons, CO and NOx emissions under stoichiometric air/fuel ratios. This second catalyst includes a catalyst mixture PM-Rh, wherein PM is a catalyst material containing Pt, Pd or combinations thereof. The second catalyst further includes a metal oxide such as oxides of aluminum, alkali metals, alkaline earth metals, as well as a metal oxide selected from the group consisting of zirconium, cerium and combinations thereof. This second catalyst may optionally also include suppressants for $H_2S$ emissions such as nickel oxide.

We have found that a catalyst system of this construction and composition is capable of oxidizing hydrocarbons and carbon monoxide while also storing NOx under lean conditions. This catalyst system further provides for the combined treatment of emissions from engines operating under stoichiometric and lean burn conditions, provides increased thermal stability and light-off for the catalyst and eliminates the NOx release associated with lean NOx traps. This and other aspects of the invention will be described in detail below.

DETAILED DESCRIPTION

Demands for improved fuel economy and lower $CO_2$ emissions have encouraged engine manufacturers to increase the air/fuel ratio above 14.7—above the stoichiometric condition (14.6).

Figure 1:
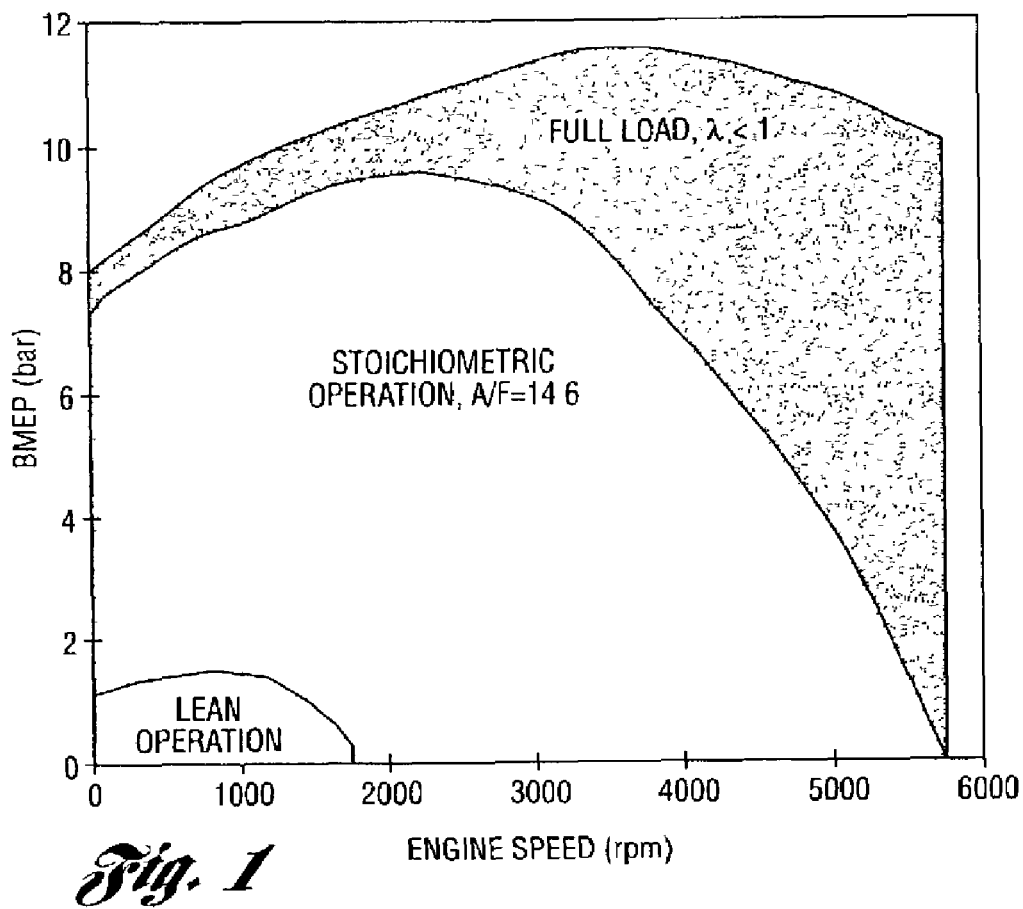
FIG. 1 is a schematic of engine speed versus brake mean effective pressure (BMEP) at different air/fuel ratios.

In one newer engine design, the engine is run under stoichiometric conditions most of the time, except under low load (brake mean effective pressure (BMEP)<1.2 bar), low engine speed (RPM<1750) conditions, when the engine is run under stratified-charged lean conditions, an air/fuel ratio of approximately 30. The operation diagram of a stratified charged engine is schematically shown as FIG. 1. Also shown in FIG. 1 is the operation range when the engine is run under stoichiometric condition and under full load with air to fuel ratio under net fuel rich condition. It is predicted that operation of this engine design would increase fuel economy by approximately 5%. If used with the present invention, this engine operation would also meet the Euro stage IV emissions standards, without increasing the cost of the catalyst system. For such engines, designed to operate at least partially under lean conditions, the present invention provides a catalyst system capable of reducing CO, HC, and NOx—in line with current and future emission standards.

Figure 2:
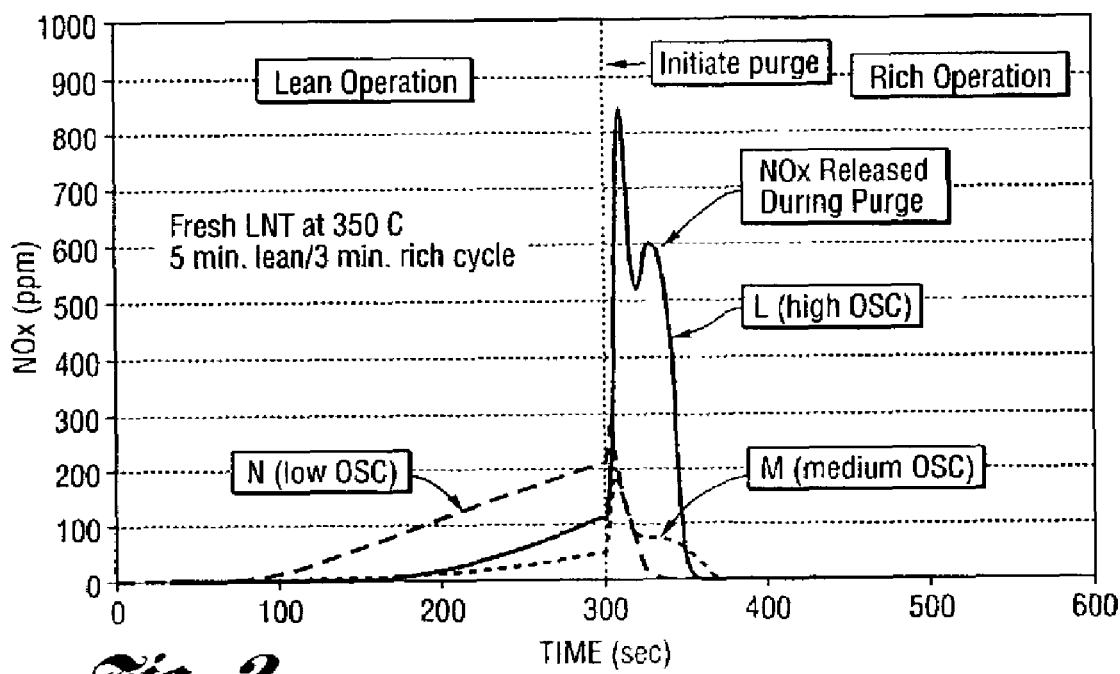
FIG. 2 is a graph showing NOx conversions and NOx release of lean NOx traps with different oxygen storage capacity ("OSC") during lean to rich transitions.

As set forth above, FIG. 2 depicts typical lean NOx release during the lean-rich transition of a lean NOx trap. The NOx released during the purge cycle of the trap is believed to occur due to the exothermic heat generated from the oxidation of reductants CO, HC and $H_2$ by the oxygen released from the oxygen storage material.

Figure 3:
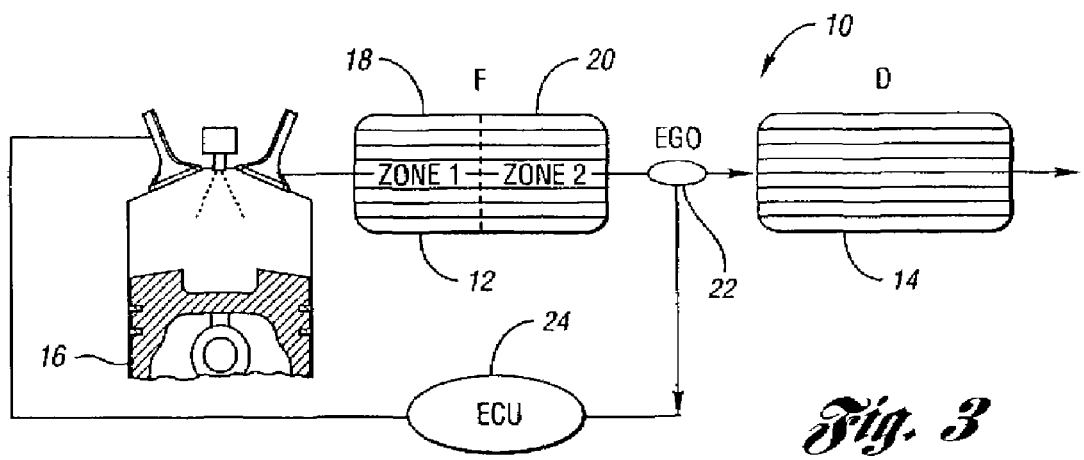
FIG. 3 is a schematic view of a catalyst system that incorporates the present invention, showing a first catalyst having two zones and a second catalyst.

FIG. 3 depicts one embodiment of the present catalyst system 10 of the present invention, a system for the treatment of emissions both under stoichiometric operation and under stratified-charged short lean condition (idling and low speed cruises). As shown, the catalyst system 10 includes two catalysts 12, 14 in a close-coupled location. The forward catalyst 12 is optimized to function when the engine 16 is operated under lean conditions. The forward catalyst 12 will store excess NOx during lean operation and then release and convert the NOx when the engine 16 switches to rich conditions. The downstream catalyst 14 is optimized to effectively convert HC, CO, and NOx under stoichiometric operations, as well as convert any remaining lean NOx emissions not adsorbed by the forward catalyst 12.

The forward catalyst 12 consists of two zones 18, 20. It should be noted that this invention also contemplates the use of layers in place of zones. By zoning or layering the forward catalyst 12, the problems with NOx release are overcome. Zone 18 is preferably made from a foraminous substrate, such as an alumina substrate that functions as a carrier for the catalyst material and acts as a passage for the exhaust gas stream. The substrate is coated with a high loading of a precious metal (PM) such as Pt, Pd and/or Rh. Zone 18 further includes oxides of aluminum, alkali metals or alkaline earth metals, or a combination of the two, such as barium oxide, magnesium oxide, or potassium oxide. The total amount of alkali metals or alkaline earth metals or a combination of the two ranges from 2-15 (wt) %. Zone 18 is, however, devoid of cerium. In a preferred embodiment, zone 18 of the forward catalyst 12 consists of platinum and rhodium loaded on an alumina substrate in the ratio of 5:1 to 25:1 with a total loading of approximately 60-300 g/ft$^3$. In this preferred embodiment, the Rh is anchored on 3-5% (wt) $ZrO_2$ particles. The $Al_2O_3$ substrate is stabilized by approximately 1-8% (wt) $La_2O_3$.

Zone 20 of the forward catalyst 12 is also made from a foraminous substrate, usually alumina that functions as a carrier for the catalyst material. Zone 20 includes oxides of aluminum, alkali metals, alkaline earth metals, rare earth metals, or combinations thereof and a lower loading of precious metals (PM) than zone 18. Zone 20 may optimally include oxides of zirconium. In a preferred embodiment, the alumina substrate in zone 20 is coated with a solution containing 10-40% (wt) of BaO and/or MgO on an $Al_2O_3$ washcoat. In a preferred embodiment, zone 20 of the forward catalyst 12 consists of Pt and Rh loaded on an alumina substrate in the ratio of 1:1 10:1, with a total loading of about 10-100 g/ft$^3$. Zone 20 preferably includes a small amount of mixed oxides of zirconium and cerium.

The downstream catalyst 14 is manufactured in a method similar to zone 18. The downstream catalyst 14 also contains a catalyst material, PM-Rh, wherein the precious metals (PM) can be platinum, palladium or combinations thereof, preferably platinum and rhodium in a ratio of Pt/Rh 5:1-15:1. In addition to precious metals (PM), this downstream catalyst 14 includes oxides of aluminum, alkali metals or alkaline earth metals and a high concentration of mixed oxides of zirconium and cerium. In a preferred embodiment, the total loading of the catalyst material in the downstream catalyst 14 is about 10 g/ft$^3$-120 g/ft$^3$. In a preferred embodiment, both Pt and Rh are anchored on 5-30% (wt) high surface area Ce/Zr with high $O_2$ kinetics (e.g., Ce/Zr=50:50 molar ratio). The alumina washcoat is preferably also stabilized by 2-15 (wt) % BaO. Optionally, the downstream catalyst 14 may also include hydrogen sulfide emission suppressants such as nickel oxide.

The foregoing catalyst system 10 minimizes the oxygen storage function in the front zone of the first catalyst, so that NOx release is minimized. The reduction of oxygen storage function in the front zone is also believed to minimize the fuel required to purge the catalyst. The forward catalyst 12 functions to store the NOx produced by engine 16 during lean operation. When the engine 16 is switched from lean to rich conditions for the purge of the first catalyst, there is minimum stored oxygen so that the oxidation reaction such as CO with $O_2$ does not cause an exothermic reaction in zone 18 and thus there is no release of unreduced NOx. The first catalyst 12 can be purged and the stored NOx converted when an engine control module determines that the NOx storage capacity of the first catalyst is approached.

Optionally, an exhaust gas oxygen sensor 22 is positioned upstream of the catalyst 14 between the forward catalyst 12 and the downstream catalyst 14, as shown in FIG. 3. Under this arrangement, there is no fuel economy penalty from the oxygen storage capacity (OSC) of catalyst 14. Using this arrangement, the oxygen storage function of the downstream catalyst 14 is minimized so that no NOx release occurs due to the exothermic reaction described above. Additionally, the cerium-free first zone and the lower loading of cerium in the second zone of the forward catalyst help to minimize the fuel penalty attributed to the purges.

Figure 4A:
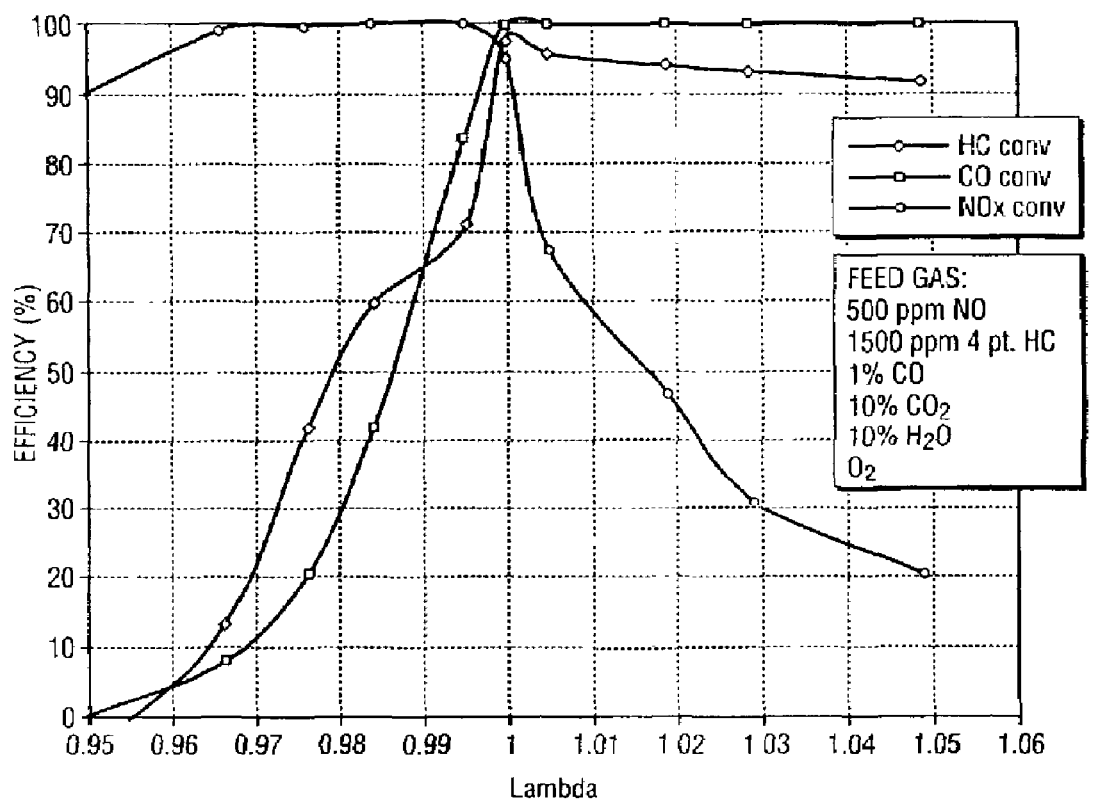
FIG. 4a is a graph of conversion efficiency for converting HC, CO and NOx for the zoned catalyst system described in example 1.
Figure 4B:
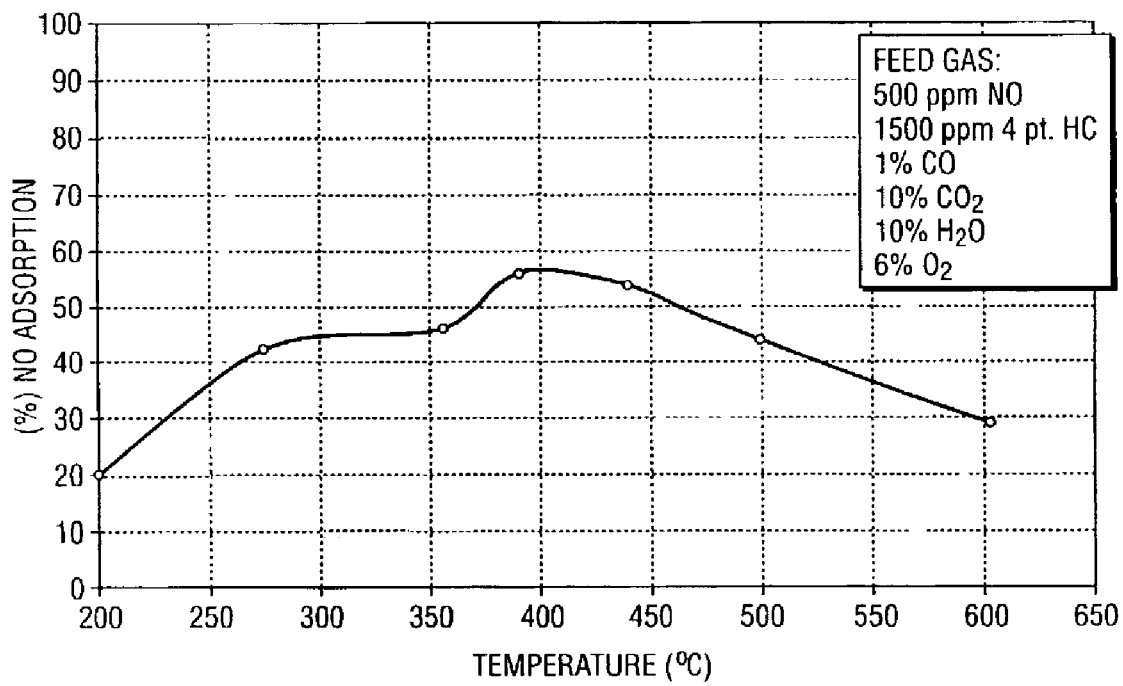
FIG. 4b is a graph of NOx adsorption versus temperature for the zoned catalyst system described in example 1.

FIGS. 4a and 4b show the experimental data on the effectiveness of the catalyst system 10. FIG. 4a shows the effectiveness in treating steady state HC, CO, and NOx and steady state lean NOx after being aged on a pulsator at 850° C. for 50 hr with a space velocity of 50,000 hr$^{-1}$. As seen in FIG. 4a, at $\lambda \cong 1$, HC, CO and NOx conversion is between 95-100% efficient. The data in FIG. 4a was obtained using the following feed gas: 500 ppm NO, 1500 ppm HC, 1% CO, 10% $CO_2$, 10% $H_2O$ and a varying amount of $O_2$. FIG. 4b shows the steady state lean NOx performance of an 850° C. aged catalyst system with a volumetric space velocity 30,000 hr$^{-1}$. As seen in FIG. 4b, because of this invention, NO is adsorbed over a wide range of operating temperatures, from 200° C. -600° C. and thus more effective for NOx reduction under a wide range of temperature parameters. The data in FIG. 4b was obtained using the following feed gas: 500 ppm NO, 1500 ppm HC, 1% CO, 10% $CO_2$, 10% $H_2O$ and 6% $O_2$.

This catalyst system is expected to be used in automotive vehicles for emission treatment in the exhaust gas system where it functions to oxidize hydrocarbons, carbon monoxide, and simultaneously reduce nitrogen oxides to desired emission levels.

Figure 5A:
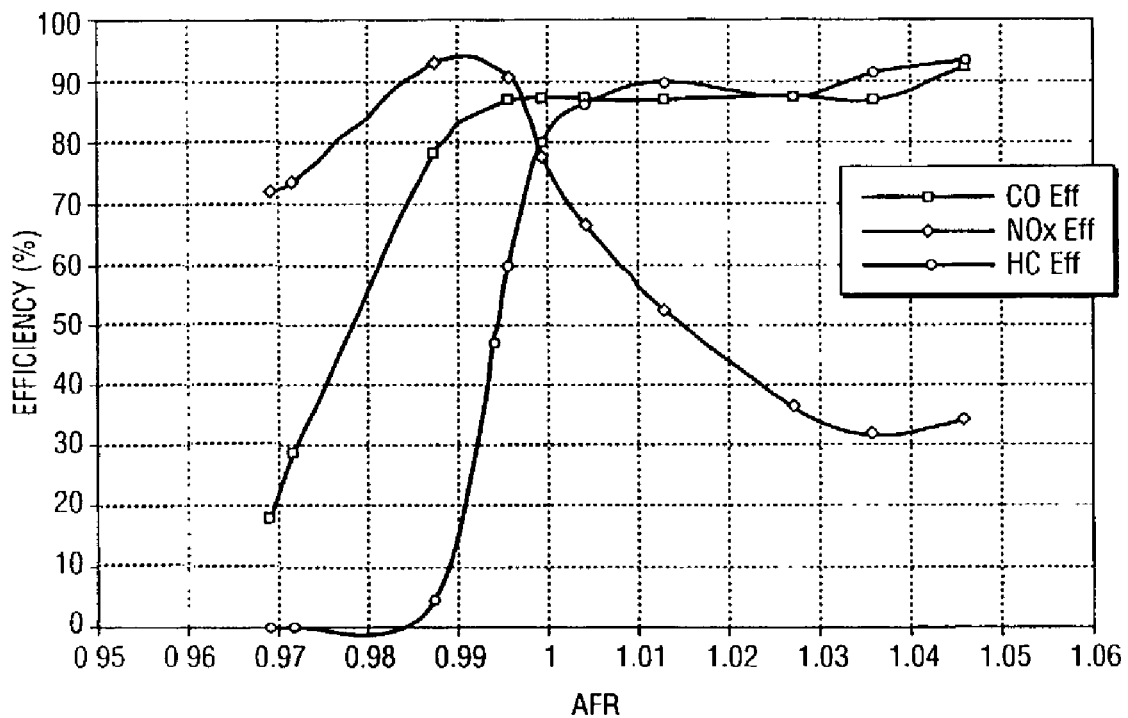
FIG. 5a is a graph of conversion efficiency for converting HC, CO and NOx for the comparative lean NOx trap described in example 2.

FIG. 5a is a graph illustrating CO, NOx and HC efficiency for the lean NOx trap described in Example 2. FIG. 5a further illustrates the lambda sweep of the lean NOx trap described in Example 2.

Figure 5B:
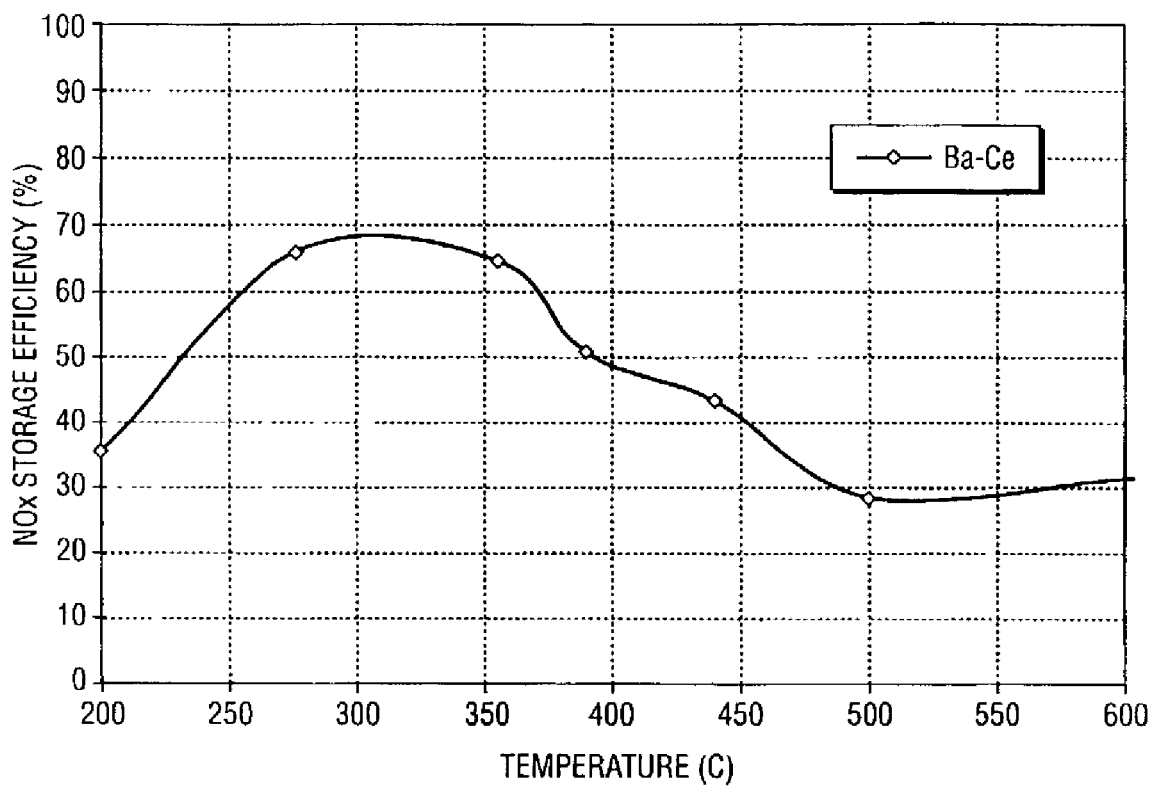
FIG. 5b is a graph of NOx adsorption versus temperature for the comparative lean NOx trap described in example 2.

FIG. 5b is a graph illustrating the temperature profile of the lean NOX trap prepared for Example 2, aged as provided in FIG. 4b.

As is known in the art, for useful application of the catalyst system in an exhaust gas system, each catalyst is deposited or washcoated on a substrate (mechanical carrier) made of a high temperature stable, electrically insulating material such as cordierite, mullite, etc. A mechanical carrier is preferably comprised of a monolithic magnesium aluminum silicate structure, i.e., cordierite, although the configuration is not critical to the catalyst system of this invention.

It is preferred that the surface area of the monolithic structure provide 50-1000 meters square per liter structure, as measured by nitrogen adsorption. Cell density should be maximized consistent with pressure drop limitations and is preferable in the range of 200-800 cells per square inch of cross-sectional area of the structure. The substrate may be in any suitable configuration, often being employed as a monolithic honeycomb structure. Other configurations useful in this invention and suitable in an exhaust gas system will be apparent to those skilled in the art in view of the present disclosure.

Techniques for providing an oxide washcoat on a substrate are well known to those skilled in the art. Generally, a slurry of the mixed metal oxide particles and optionally stabilizer particles are coated on a substrate, e.g., added by dipping or spraying, after which the excess is generally blown off. After the slurry of mixed metal oxide particles are coated on the substrate, the substrate is heated to dry and calcine the coating, generally at a temperature of about 600° C. for about 2-3 hours. Calcining serves to develop the integrity of the ceramic structure of the washcoated oxide coating. The total amount of the oxide washcoat carried on the substrate is about 10-30% (wt), based on the weight of the substrate coated. Several coatings of the substrate and the washcoat may be necessary to develop the desired coating thickness/weight on the substrate.

The precious metals may be provided on the calcined oxide coating by any technique including the well known wet impregnation technique from soluble precious metal precursor compounds. Water soluble compounds are preferred, including, but not limited to, nitrate salts and materials for platinum like chloroplatinic acid. As known in the art, after impregnating the washcoat with the precursor solution, it is dried and heated to decompose the precursor to its precious metal or precious metal oxide. As is known in the art, the precursor may initially decompose to the metal but be oxidized to its oxide in the presence of oxygen. While some examples of precious metal precursors have been mentioned above, they are not meant to be limiting. Still other precursor compounds would be apparent to those skilled in the art in view of the present disclosure.

In addition to this incorporation from a liquid phase, the precious metal, such as platinum, may be provided by sublimation of platinum chloride or other volatile platinum salts, by a solid state exchange in the 300-500° C. temperature range using labile platinum compounds. There is no criticality to the type of precursor compounds that may be used to provide the precious metal according to this invention.

Additionally, co-precipitation techniques can also be used to form the catalyst. Such co-precipitation techniques are well known to those skilled in the art. According to such techniques, the soluble salts can be dissolved in a solvent, for example, nitrates of the rare earth metals are dissolved in water. Co-precipitation is then obtained by making the solution basic, e.g., a pH of 9 by adding a base like ammonium hydroxide. Other soluble metal compounds such as, for example, sulfates and chlorides, may be used as may mixtures or various soluble compounds, e.g., nitrates with chlorides. The precipitate would then be heated to decompose it to the mixed metal oxide. This heating or calcination usually would be carried out at temperatures of up to 500° C. It should be noted that the way in which the oxide is obtained for use in forming the catalyst is not critical to the invention. Still other ways and other soluble salts would be apparent to those skilled in the art in view of the present disclosure.

Figure 6:
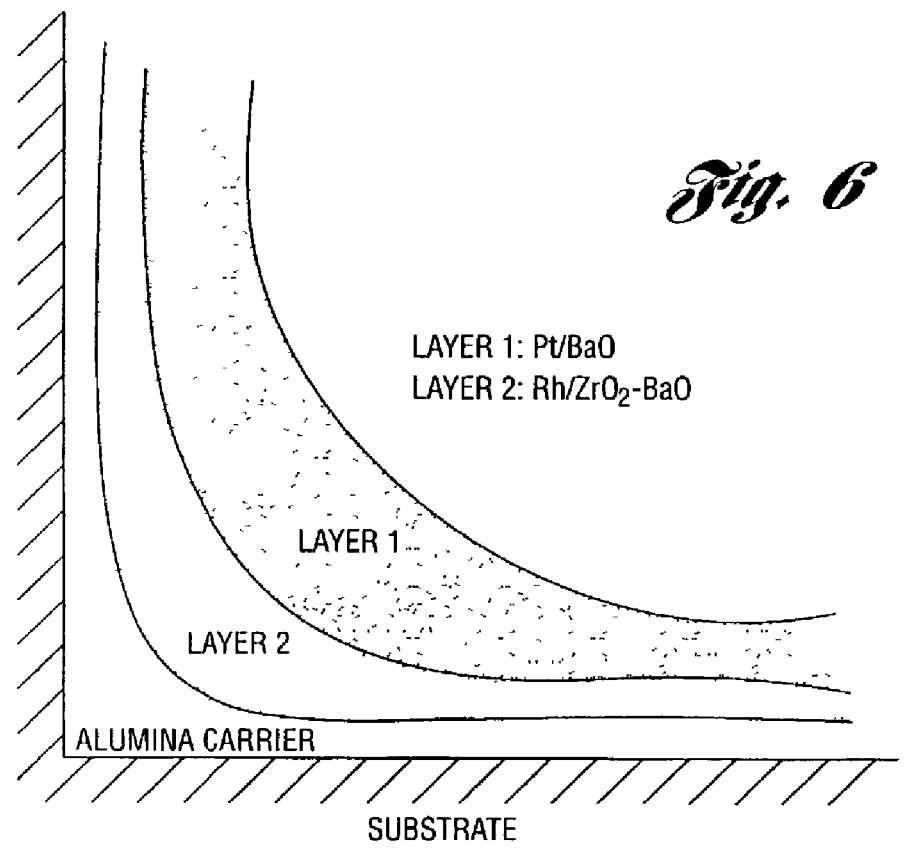
FIG. 6 is a schematic view of a catalyst system that incorporates the present invention, showing a catalyst having two layers.

In yet another embodiment of this invention, the forward catalyst 12 has a layered structure, rather than the zoned structure of the previous embodiment. As shown in FIG. 6, the forward catalyst has a top layer which contains a catalyst material PM-Rh wherein the precious metal (PM) is selected from the group consisting of platinum, palladium and combinations thereof. This top layer further includes metal oxides selected from the group consisting of oxides of aluminum, alkali metals, alkaline earth metals and combinations thereof. The top layer is preferably Pt and Rh in a 5:1 to 25:1 ratio with a total loading of 60-300 g/ft$^3$. This top layer is further preferably stabilized by 2-15% (wt) of BaO.

The bottom layer includes a catalyst material PM-Rh wherein the precious metal (PM) is selected from the group consisting of Pt, Pd and combinations thereof. This bottom layer preferably includes Pt and Rh in a 1:1 to 10:1 ratio, with a total loading of 10-100 g/ft$^3$. The bottom layer can optionally include small amounts of mixed oxides such as zirconium oxide, cerium oxide and combinations thereof.

As shown in FIG. 6, the bottom layer preferably contains rhodium anchored on 3-5% (wt) $ZrO_2$, 2-30% (wt) BaO and MgO. In the preferred embodiment, the alumina washcoat is stabilized by 2-8% (wt) $La_2O_3$. The alumina washcoat in the second bottom layer can optionally be stabilized by composite oxides of cerium-lanthanum.

In this embodiment, the downstream catalyst 14 has the same formulations as described above. More specifically, this downstream catalyst 14 includes a catalyst material PM-Rh, wherein the precious metal (PM) is Pt, Pd or combinations of the two. The downstream catalyst 14 preferably contains PM and Rh in a ratio of 5:1 to 15:1 with a total loading of 10-120 g/ft$^3$. This catalyst also includes mixed oxides of aluminum, alkali metals, alkaline earth metals or combinations thereof. Additionally, this downstream catalyst 14 includes a high concentration of mixed oxides of zirconium, cerium or their combination. Both PM and Rh are preferably anchored on 5-30% (wt) high surface area Ce/Zr with high $O_2$ kinetics (e.g., Ce/Zr 50:50 molar ratio). Additionally, in the preferred embodiment the alumina washcoat is stabilized by 10% (wt) BaO. This downstream catalyst can also optionally contain suppressants for $H_2S$ emissions such as NiO.

In yet another alternate embodiment of this invention, a single catalyst is designed to include multiple zones, where each zone is designed to provide specific functional advantages. In one embodiment, a catalyst is provided with two zones, a first-ceria containing zone designed to provide fast light-off and optimize conversion of HC, CO and NOx under stoichiometric conditions, and a second non-ceria containing zone including NOx trapping materials designed to optimize NOx reduction under lean conditions. This two-zone catalyst provides fast light-off, high activity at stoichiometric conditions and high NOx storage capabilities at lean conditions. The first ceria-containing zone protects the second non-ceria zone from exothermic reactions during aging and thus improves the durability of the second non-ceria zone. The ceria first zone also provides the ability to desulfate the second non-ceria zone. The non-ceria second zone minimizes NOx release during purges due to the absence of ceria.

In this two-zone single catalyst embodiment, the first zone preferably includes alumina, a catalyst mixture PM-Rh where PM is a catalyst material selected from the group consisting of Pt, Pd and combinations thereof, and metal oxides of zirconium, cerium and combinations thereof. In this embodiment, the second zone preferably includes alumina, a catalyst mixture PM-Rh as stated above and metal oxides of alkali metals, alkaline earth metals and combinations thereof.

In another embodiment, a catalyst is designed to include three zones, a first ceria-containing zone designed to provide fast light-off and optimize conversion of HC, CO and NOx under stoichiometric conditions, followed by a second non-ceria containing zone which includes NOx trapping materials designed to optimize NOx reduction under lean conditions, and a third ceria-containing zone with a $H_2S$ suppressant. Once again, the first ceria-containing zone provides fast light-off and high activity at stoichiometric conditions. This first ceria-containing zone also protects the second non-ceria zone from exothermic reaction during aging, increasing durability of the second non-ceria containing zone. The non-ceria containing zone minimizes NOx released during purging due to the absence of ceria. The third ceria-containing $H_2S$ suppressant zone minimizes the $H_2S$ emissions during desulfations of the second zone without re-poisoning the second zone. It should be noted that the third ceria containing zone could optionally include some additional NOx storage materials. Additionally, the third zone contains ceria and a precious metal PM-Rh to minimize the HC and CO emissions during NOx purges and to provide additional activity at stoichiometric conditions.

In this three-zone single catalyst embodiment, the preferable mixture for the first and second zones is the same as set forth for the two-zone single catalyst embodiment. In this three-zone embodiment, the third zone preferably includes alumina, a catalyst mixture PM-Rh as stated above, metal oxides of zirconium, cerium and combinations thereof, and hydrogen sulfide suppressants.

EXAMPLE 1

Fumed alumina $Al_2O_3$ (15 g, Degussa), $Ba(NO_3)_2$ (7.42 g), $KNO_3$ (0.3 g), La $(NO_3)_3.6H_2O$ (20.3 g), and $H_2PtCl_6.6H_2O$ (1.48 g) are each added to 500 ml deionized water, heated to 60° C., and then mixed as solution 1 with the final desired ratios. A rhodium solution containing 0.10 g $Rh(NO_3)_4$ is deposited onto 2.6 g $ZrO_2$, dried at 80 E C for eight hours and then calcined at 600° C. for six hours. The resulting powder is crushed and added to solution 1. Meanwhile, fumed alumina $Al_2O_3$ (15 g, Degussa), $Ba(NO_3)_2$ (14.84 g), and $Rh(NO_3)_4$ (0.1 g), and $H_2PtCl_6.6H_2O$ (0.23 g) are each added to 500 ml deionized water, heated to 60° C., and then mixed as solution 2 with the final desired ratios. The top half of a core of 400 cell per square inch cordierite (2 inch in diameter and 3.25 inch in length, zone 1) was dipped into solution 1, and then dried at 80° C. overnight. This process was repeated until the desired amount of mixed compound was coated on the core. The bottom half of the core (zone 2) was then dipped into solution 2, and then dried at 80° C. overnight. This process was also repeated until the desired amount of compound was coated on to the bottom half of the core. The coated core was then calcined in air at 600° C. for 6 hours.

EXAMPLE 2

This is a comparative example of a conventional lean NOx trap. Fumed alumina (50.0 g, Degussa), and $Ba(NO_3)_2$ (17.13 g) are dissolved in 500 ml deionized water. This mixture is stirred on a hot plate for 1 hour, and then dried at 80° C. overnight, and then calcined at 600° C. for 6 hours. The calcined powder is ground with 2.5 g Ce/Zr mixed oxide (W.R. Grace) for 48 hr in 100 ml deionized water. Then it is dried at 80° C. overnight, and calcined at 600° C. for 6 hours. This powder is then mixed with $H_2PtCl_6.6H_2O$ in 2.65 g deionized water, ground for 24 hour, then dried at 80° C. and calcined at 600° C. for 6 hr.

EXAMPLE 3

This example shows the test procedures and conditions. The steady state lean NOx trapping efficiency was measured in a flow reactor as an average efficiency during a 1 minute lean period under different temperatures. The feedgas cycled with 60 seconds lean and 5 seconds rich at a constant space velocity of 30,000 hour$^{-1}$. The flow rates were strictly controlled by mass flow controllers. The gas concentrations were measured by a V&F mass spectrometer. The feedgas composition was:

| Gases | Concentration (lean) | Concentration (rich) |
| --- | --- | --- |
| NO | 500 ppm | 500 ppm |
| HC | 1500 ppm | 1500 ppm |
| CO | 0 | 4% |
| $H_2$ | 0 | 1.33% |
| $O_2$ | 6% | 0 |
| $CO_2$ | 10% | 10% |
| $H_2O$ | 10% | 10% |
| $N_2$ | balance | balance |

The lambda sweep tests were also conducted in a flow reactor at 400° C. with a gas space velocity of 30,000 hour$^{-1}$. Here the feedgas composition remains constant except the oxygen concentration varies to achieve the desired lambda value. The feedgas contains 2000 ppm HC, 500 ppm NO, 1% CO, 0.33% $H_2$, 10% $CO_2$, 10% $H_2O$, and $N_2$ balance.

Catalyst aging is conducted in a pulse flame combustor using a proprietary aging cycle for 50 hours with a maximum gas temperature at 1000° C.

The foregoing catalyst systems constructions and compositions have been found useful in reducing harmful engine emissions. Variations and modifications of the present invention may be made without departing from the spirit and scope of the invention or the following claims.

The invention claimed is:

1. A catalyst system for use in reducing emissions from an exhaust gas stream containing hydrocarbons, CO and NOx comprising:

a first lean NOx trapping catalyst for optimizing the storage of NOx emissions under lean air/fuel ratios, comprising a first zone and a second zone, wherein the entire first zone is positioned upstream of the second zone;

said first zone comprising a) a catalyst mixture PM-Rh, where PM is a catalyst material selected from the group consisting of Pt, Pd and combinations thereof, and b) a metal oxide selected from the group consisting of oxides of aluminum, alkali metals, alkaline-earth metals, and combinations thereof, wherein said first zone is devoid of cerium;

said second zone comprising a) a catalyst mixture PM-Rh, where PM is a catalyst material selected from the group consisting of Pt, Pd and combinations thereof, and b) a metal oxide selected from the group consisting of alkali metals, alkaline earth metals, rare earth metals and combinations thereof; and a second catalyst for optimizing the reduction of hydrocarbon, NOx and CO emissions under stoichiometric air/fuel ratios comprising: a) a catalyst mixture PM-Rh, where PM is a catalyst material selected from the group consisting of Pt, Pd and combinations thereof, b) a metal oxide selected from the group consisting of oxides of aluminum, alkali metals, alkaline earth metals and combinations thereof, and c) a metal oxide selected from the group consisting of oxides of zirconium, cerium and combinations thereof.

2. The catalyst system of claim 1, wherein said second zone of said first catalyst further comprises zirconium oxide.

3. The catalyst system of claim 1, wherein said second catalyst further comprises hydrogen sulfide emission suppressants.

4. The catalyst system of claim 1, wherein said second catalyst further comprises nickel oxide.

5. The catalyst system of claim 1, wherein said Rh in said first catalyst is placed on ZrO2 particles of 3-5% (wt).

6. The catalyst system of claim 1, wherein said catalyst mixtures of said first and second catalysts are coated on an alumina substrate.

7. The catalyst system of claim 6, wherein said alumina substrate in said first zone is stabilized by between 1-8% (wt) La2O3.

8. The catalyst system of claim 6, wherein said alumina substrate in said second catalyst is stabilized by 2-15% (wt) BaO.

9. The catalyst system of claim 1, wherein said first zone of said first catalyst further comprises a metal oxide selected from the group consisting of barium oxide, magnesium oxide, potassium oxide and combinations thereof, wherein the metal oxide comprises 2-15% (wt).

10. The catalyst system of claim 1, wherein said second zone of said first catalyst further comprises a metal oxide selected from the group consisting of barium oxide, magnesium oxide and combinations thereof.

11. The catalyst system of claim 10, wherein said second zone of said first catalyst comprises BaO and MgO of 10-40% (wt).

12. The catalyst system of claim 1, wherein said catalyst mixture PM-Rh in said first zone of said first catalyst comprises Pt and Rh in a ratio of between 5:1 and 25:1.

13. The catalyst system of claim 1, wherein said catalyst mixture PM-Rh in said first zone of said first catalyst has a loading of between 60-300 g/ft3.

14. The catalyst system of claim 1, wherein said second zone of said first catalyst comprises Pt and Rh in a ratio of between 1:1 and 10:1.

15. The catalyst system of claim 1, wherein said catalyst mixture PM-Rh in said second zone of said first catalyst has a loading of between 10-100 g/ft3.

16. The catalyst system of claim 1, wherein said catalyst mixture PM-Rh in said second catalyst comprises Pt and Rh in a ratio of between 5:1 and 15:1.

17. The catalyst system of claim 1, wherein said catalyst mixture PM-Rh in said second catalyst has a loading of between 10-120 g/ft3.

18. The catalyst system of claim 1, wherein PM-Rh in said second catalyst comprises Pt and Rh placed on Ce and Zr particles of 5-30% (wt) wherein the molar ratio of Ce and Zr is 50:50.

19. The catalyst system of claim 1, wherein said first catalyst and said second catalyst are close-coupled, said first catalyst being positioned in a forward position and said second catalyst being positioned in a downstream position.

20. The catalyst system of claim 1, wherein an exhaust gas sensor is placed between said first and second catalysts.

21. A catalyst for use with an internal combustion engine to provide emission reductions, comprising:

a first zone for optimizing the reduction of hydrocarbon, NOx and CO emissions under stoichiometric air/fuel ratios and a second NOx trapping zone for optimizing NOx reductions under lean air/fuel ratios, wherein the entire first zone is positioned upstream of the second zone and wherein the first zone and the second zone are contained within a single catalyst structure;

said first zone comprising a) a catalyst mixture PM-Rh where PM is a catalyst material selected from the group consisting of Pt, Pd and combinations thereof, and b) a metal oxide selected from the group consisting of cerium, zirconium and combinations thereof; and said second zone comprising a) a catalyst mixture PM-Rh, where PM is a catalyst material selected from the group consisting of Pt, Pd and combinations thereof; and b) a metal selected from the group consisting of oxides of aluminum, alkali metals, alkaline earth metals and combinations thereof, wherein said second zone is devoid of cerium to minimize the release of unreduced NOx.

22. A catalyst for use with an internal combustion engine to provide emission reductions, comprising:

a first zone for optimizing the reduction of hydrocarbon, NOx and CO emissions under stoichiometric air/fuel ratios, a second NOx trapping zone for optimizing NOx reduction under lean air/fuel ratios, and a third zone to minimize hydrogen sulfide emissions, said first zone comprising a) a catalyst mixture PM-Rh where PM is a catalyst mixture selected from the group consisting of Pt, Pd and combinations thereof, and b) a metal oxide selected from the group consisting of cerium, zirconium and combinations thereof;

said second zone comprising a) a catalyst mixture Pm-Rh, where PM is a catalyst material selected from the group consisting of Pt, Pd and combination thereof; and b) a metal selected from the group consisting of oxides of aluminum, alkali metals, alkaline earth metals and combinations thereof, wherein said second zone is devoid of cerium, wherein the entire first zone is positioned upstream of the second zone and wherein the first zone and the second zone are contained within a single catalyst structure; and said third zone comprising a) a hydrogen sulfide suppressant, b) a catalyst mixture PM-Rh where PM is a catalyst material selected from the group consisting of Pt, Pd and combinations thereof, and c) a metal oxide selected from the group consisting of cerium, zirconium and combinations thereof.

* * * * *